(12) United States Patent
Keranen et al.

(10) Patent No.: US 6,681,099 B1
(45) Date of Patent: Jan. 20, 2004

(54) METHOD TO CALCULATE TRUE ROUND TRIP PROPAGATION DELAY AND USER EQUIPMENT LOCATION IN WCDMA/UTRAN

(75) Inventors: Yrjo Keranen, Topeno (FI); Timo Viero, Espoo (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/571,624

(22) Filed: May 15, 2000

(51) Int. Cl.[7] .............................................. H04B 17/00
(52) U.S. Cl. ................. 455/67.16; 455/423; 455/456.1; 455/67.11; 342/357.08
(58) Field of Search ................................ 455/456, 500, 455/517, 67.1, 67.6; 342/47, 88, 95, 125, 126, 140, 133, 139, 357.08, 357.1, 450

(56) References Cited

U.S. PATENT DOCUMENTS

| | | | |
|---|---|---|---|
| 5,945,948 A | 8/1999 | Buford et al. .............. | 342/457 |
| 6,011,974 A | * 1/2000 | Cedervall et al. ........... | 455/456 |
| 6,137,441 A | * 10/2000 | Dai et al. ............... | 342/357.16 |
| 6,300,905 B1 | * 10/2001 | Chen et al. .................. | 342/458 |
| 6,356,763 B1 | * 3/2002 | Kangas et al. .............. | 455/456 |
| 6,366,762 B1 | * 4/2002 | Miller et al. ............... | 455/67.6 |
| 6,381,464 B1 | * 4/2002 | Vannucci .................... | 455/456 |

FOREIGN PATENT DOCUMENTS

| | | | | |
|---|---|---|---|---|
| EP | 0 743 802 A2 | 11/1996 | ............ | H04Q/7/38 |
| EP | 0 933 961 A2 | 8/1999 | ............ | H04Q/7/38 |
| WO | WO 99/15911 | 4/1999 | | |
| WO | WO 99/44375 | 9/1999 | ............ | H04Q/7/20 |

* cited by examiner

*Primary Examiner*—Edward F. Urban
*Assistant Examiner*—Simon Nguyen
(74) *Attorney, Agent, or Firm*—Cohen, Pontani, Lieberman & Pavane

(57) ABSTRACT

A method of determining the location of a user equipment includes determining a round trip time for downlink from at least three nodes to a user equipment, determining the transmission timing delay at the user equipment for the round trip time of each of the three nodes, and determining a distance from each of the at least three nodes using the round trip time and the transmission timing delay.

33 Claims, 5 Drawing Sheets

METHOD TO CALCULATE TRUE ROUND TRIP PROPAGATION DELAY AND USER EQUIPMENT LOCATION IN WCDMA/UTRAN

BACKGROUND OF THE INVENTION

1. Field of the Invention

The present invention relates to determination of a location of user equipment using true round trip time measurement in a third generation wideband code division multiple access networks.

2. Description of the Related Art

Third Generation (3G) mobile communication systems include LoCation Services (LCSs) which measure radio signals to determine the geographic location of a User Equipment (UE). The location information may be requested by and reported to a client and/or application associated with the UE or an external client in the Core Network (CN) of the 3G mobile communication system. Furthermore, the location information is also used by the Universal Terrestrial Radio Access Network (UTRAN) of the 3G mobile communication system to facilitate location assisted handovers or to support other features, such as home location billing.

The LCSs for 3G mobile communication systems are based on methods that have been used for the Global System for Mobile Communication (GSM) which include Time of Arrival (TOA), Observed Time Difference of Arrival (OTDOA), and Global Positioning System (GPS). These positioning methods are described in technical specification GSM 03.71, version 7.2.1. The TOA method comprises transmitting a signal from a UE and measuring the time of arrival of the signal at three or more measurement units. The difference in times of arrival is determined by pair-wise subtraction of the measured times of arrival. The mobile position may then be calculated via hyperbolic trilateration. However, to determine the actual time differences, the real time difference (RTD) between the three measurement units must be known or determined.

The OTDOA method of LCS measures the difference in time of arrival at the UE of the signals from several nodes or Base Station Transceivers (BTSs). This method also requires that the RTD between the BTSs be determined. The determination of the RTD for both the TOA and OTDOA methods of LCS is complex and therefore reduces the efficiency of the system.

However, the GPS assisted method of location requires that the UE have a GPS receiver. This requirement thus adds both bulk and cost to the UE.

SUMMARY OF THE INVENTION

It is an object of the present invention to provide a method for determining a geographic location of a User Equipment (UE) by calculating the true Round Trip Time (RTT).

According to an embodiment of the present invention, a method for determining a geographic location of the UE in a 3G wireless network includes measuring the RTT between the UE and at least three radio transmission nodes of the wireless network. The RTT is the time required for a downlink (DL) transmission from a node to a UE to the reception of an uplink (UL) transmission at the node from the UE in response to the DL transmission. FIG. 4 illustrates the RTT. At time t1 a node B of a wireless network begins transmission of a DL transmission in a dedicated physical channel (DPCH) path. The DL transmission is received by the UE at time t2, which is a one-way propagation delay $T_P$ after the time t1. After the passage of time equal to a nominal transmission timing delay $T_0$, the UE begins transmission of a UL transmission in the DPCH path at time t3 in response to the DL transmission. After another one-way propagation delay $T_P$, the Node B receives the UL transmission at time t4. Therefore, the RTT comprises a first one-way propagation delay, the nominal transmission timing delay, and a second one-way propagation delay or $RTT=T_P+T_0+T_P$. The nominal transmission timing delay is defined as a constant value of 1024 chips.

An RTT measured by a cell in a node B, such as a Base Transceiver Station (BTS), of a Universal Terrestrial Radio Access Network (UTRAN) in a 3G mobile communication system is roughly defined by the time difference between t1 and t4. Since the nominal value of the transmission timing delay or DL-UL timing offset $T_0$ at the UE (t3–t2) is known, the round trip propagation delay (RTPD), which equals $2T_P$ can be calculated by subtracting $T_0$ from the RTT. Since RTPD is related to the distance (i.e., time x velocity), the location of the UE can be estimated if the UE is connected to three or more nodes of the UTRAN whose locations are known.

However, in a 3G network, the UE Rx–Tx timing difference, which is the time between reception of the DL transmission at the UE and transmission of the UL transmission from the UE (i.e., t3–t2), is not a fixed time period and may be different from the nominal transmission timing delay $T_0$ when (1) the UE is moving relatively fast toward or away from the BTS, (2) the propagation paths vary, and (3) there is a soft handover of the UE from one cell to another. Accordingly, a geographic location based on the RTT using the nominal transmission timing delay $T_0$ may be somewhat inaccurate.

According to the present invention, the RTT and the UE Rx–Tx timing difference (t3–t2) are determined for each cell that the UE is connected to when an LCS server or any other server calculates the UE location. Using these values, the true RTPD may be accurately determined.

The present invention removes the inaccuracy in determining the propagation delay associated with the RTT measurements caused by the difference between the UE Rx–Tx timing difference and the nominal transmission timing delay $T_0$. In the preferred embodiment the RTT is measured separately for each cell in active communication with the UE. Therefore, the preferred embodiment eliminates the requirement for determining the real time difference (RTD) between the various nodes used for measurement.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
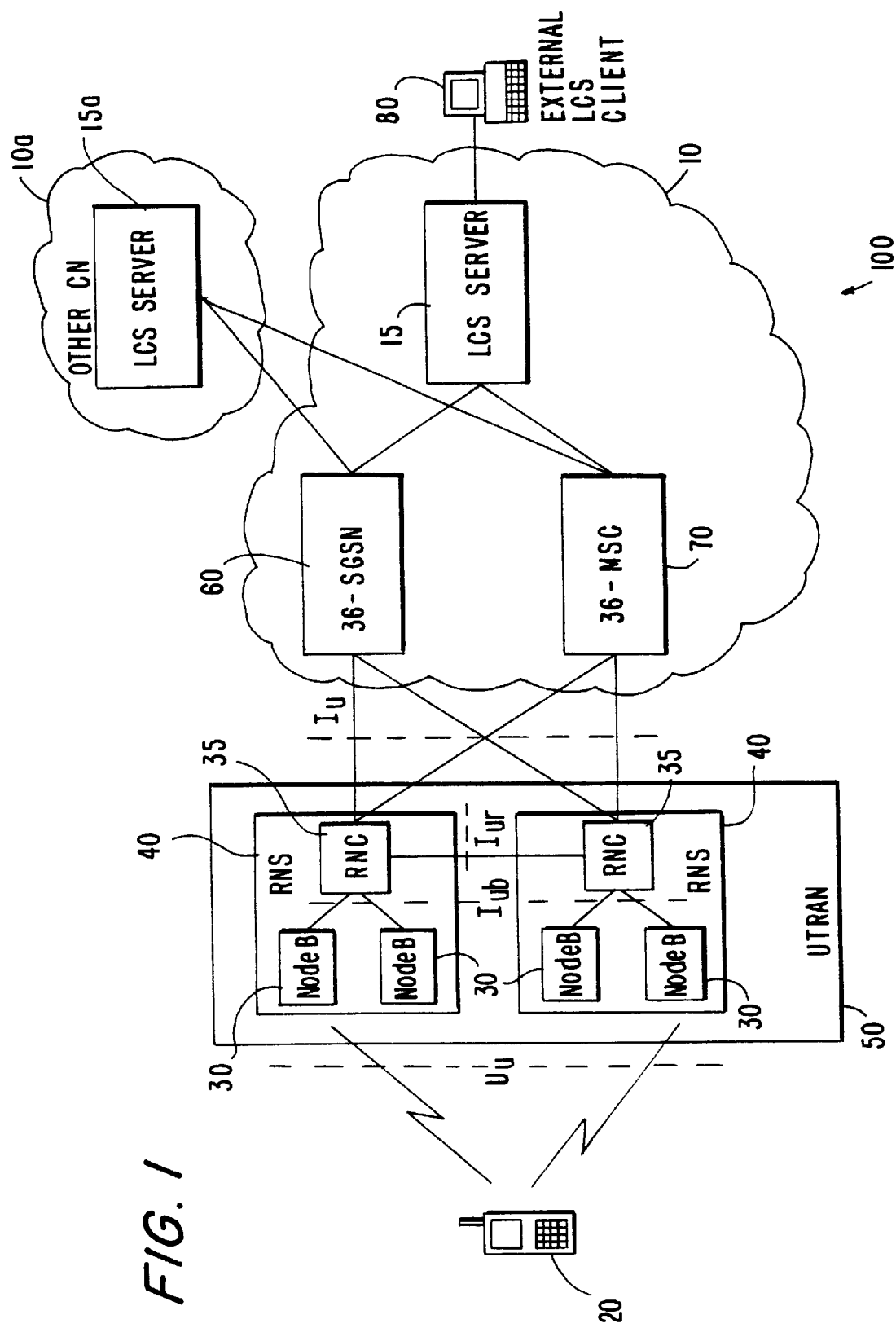
FIG. 1 is a schematic diagram of a Third Generation Mobile Communication System having a Location Service Server.

A Third Generation (3G) mobile communication system 100 for performing the method according to the present invention is shown in FIG. 1. The 3G mobile communication system 100 comprises a Core Network (CN) 10 with a LoCation Service (LCS) server 15 for providing location information about a User Equipment (UE) 20 within the geographical area covered by the CN 10. The UE 20 is a mobile equipment with one or several Universal Mobile Telephone System (UMTS) Subscriber Identity Module(s). The UE 20 may comprise a mobile phone, person digital assistant (PDA), a device based on WAP technology, or any other mobile device capable of wireless communication. A plurality of Radio Network Subsystems (RNSs) 40 are operatively connected with the CN 10. Each RNS 40 comprises a plurality of radio transmission nodes 30. Each node 30 comprises a Node B, i.e., a logical node for radio communication with the UE 20 in one or more cells in that geographical area of that node B. Each RNS 40 also has one or more Radio Network Controllers (RNCs) 35. Each RNC 35 is connected to one or more of the nodes 30 for controlling the use and integrity of the radio resources. The RNSs 40 together are referred to as a Universal Terrestrial Radio Access Network (UTRAN) 50. The CN 10 also comprises a 3G Serving GPRS Support Node (SGSN) 60 for data transmission and a 3G Mobile Services Switching Center (MSC) 70 for voice transmission.

The LCS server 15 determines location information and reports the information to a client or an application associated with the UE 20 or an external client 80 connected to the CN 10 of the 3G mobile communication system 100. The location information may also be used by the UTRAN 50 of the 3G mobile communication system to facilitate location assisted handovers and/or to support other features such as home location billing. Furthermore, the location information may also be required to facilitate direct beaming of communication signals to the UE 20.

Figure 4:
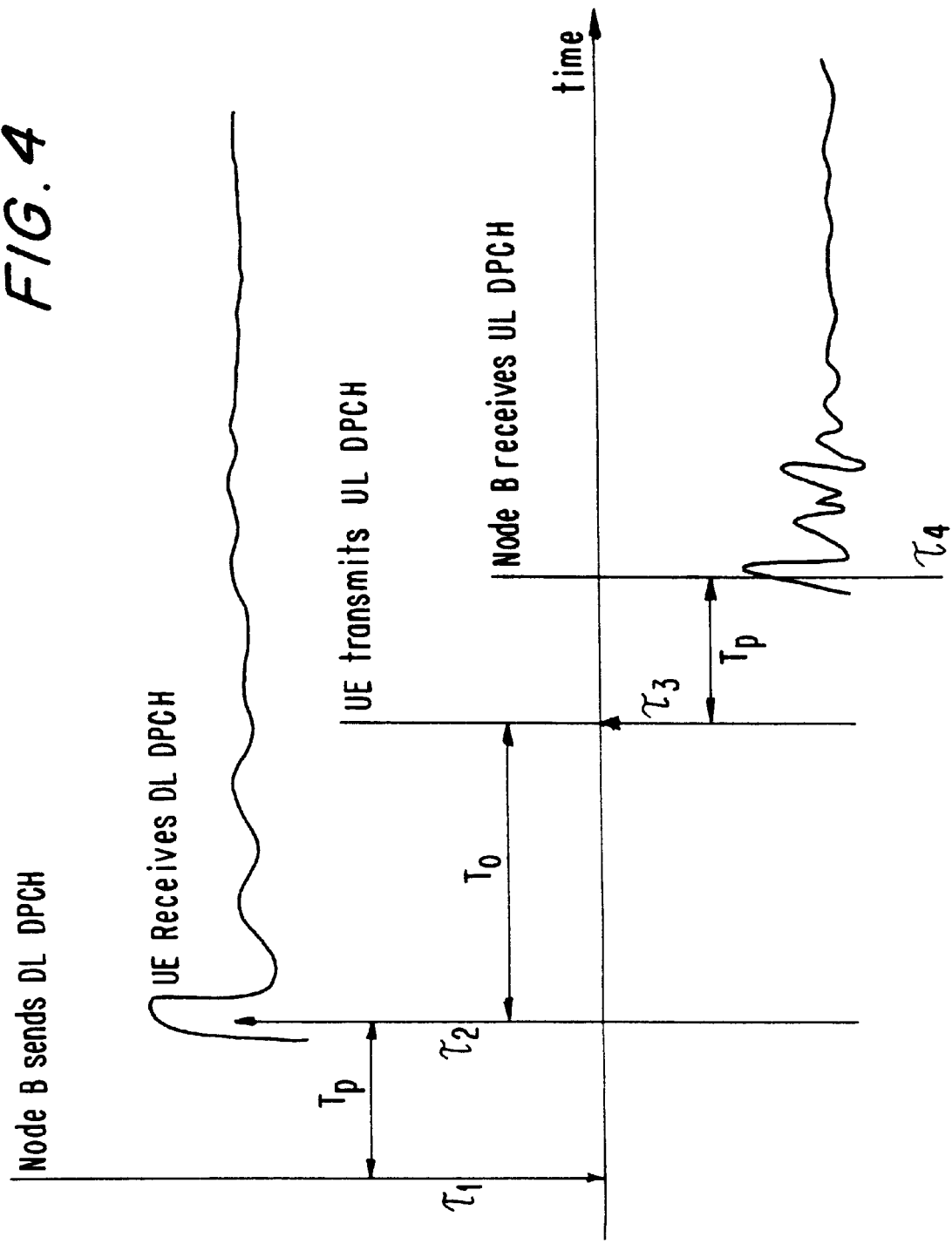
FIG. 4 is a timing diagram showing the propagation delays and the transmission timing delay of the round trip time.

In the preferred embodiment of the present invention, the LCS server 15 determines the true Round Trip Time (RTT) between the UE 20 and at least three cells of the nodes 30. This may be done by transmitting a predetermined frame in a downlink (DL) transmission to the UE from the at least three cells of the nodes 30 to which the UE responds with a predetermined frame in an uplink (UL) transmission. Referring to the timing diagram of FIG. 4, the LCS server 15 measures the RTT from the beginning of DL transmission from the UTRAN 50 to the UE 20, $\tau 1$, to the beginning of the reception of the UL transmission at the UTRAN, $\tau 4$. The RTT includes a one-way propagation delay $T_p$ for transmitting from the UE 20 to the node 30 and a one-way propagation delay $T_p$ for transmitting from the node 30 to the UE 20. Another contribution to the RTT is the UE Rx–Tx timing difference $\tau 3-\tau 2$ which is the time that the UE 20 requires between receiving the DL transmission and transmitting the UL transmission. The UE Rx–Tx timing difference has a nominal value of 1024 chips. The nominal value of the UE Rx–Tx timing difference is also referred to as the nominal transmission timing delay or DL-UL timing offset. However, there are certain situations when the UE Rx–Tx timing difference $\tau 3-\tau 2$ may be different from the defined nominal value. These situations occur when (1) the UE is moving toward or away from a node or BTS, (2) the propagation paths are varying, and (3) there is a soft handover in which a UE is switched from one cell to another.

During movement of the UE 20 toward or away from the BTS, the propagation delay between $\tau 1$ and $\tau 2$ changes. The UE 20 changes a $\tau 3$ in response to this change so that $\tau 3-\tau 2$ is equal to the nominal transmission timing delay of 1024 chips. However, the amount that $\tau 3$ can change in each increment is limited. Accordingly, if the movement is too fast, the UE 20 is prevented from adjusting the $\tau 3$ time fast enough because of the increment limit.

The same type of error occurs when the propagation path changes. When a propagation path changes, the new propagation path is usually a different length than the previous propagation path. Accordingly, the propagation delay change during a change in propagation paths thereby affects the time between $\tau 2$ and $\tau 3$.

The third situation in which the UE Rx–Tx timing difference may be different from the nominal transmission timing delay $T_0$ is after a soft handover. During a soft handover of a UE from an original cell to a target cell, the target cell adapts to the UE timing within a 256-chips boundary accuracy. Accordingly, the UE Rx–Tx timing difference is usually wrong after a soft handover—the case where there is zero error between the UE Rx–Tx timing difference and the nominal transmission timing delay $T_0$ after a soft handover occurs with a probability of 1/255. These differences, which may be present between the UE Rx–Tx timing difference and the nominal transmission timing value $T_0$, are detrimental to the determination of the propagation delay portion of the measured RTT. Therefore, when the LCS server 15 receives a location request, the LCS server 15 must determine the UE Rx–Tx timing difference of the UE 20 to determine the true round trip propagation delay (RTPD). The information regarding the current UE Rx–Tx timing difference may be transmitted from the UE 20 to the LCS server 15 only when needed (i.e., in response to a location request) or it may be transmitted at regular periodic intervals.

Since the length of the propagation delays $T_p$ of the DL and UL transmissions are related to distance of the UE 20 from the nodes 30 (i.e., distance=time×velocity), the distance of a UE 20 from a specific node 30 may be determined from the RTT if the UE Rx–Tx timing difference is known. When the distance of the UE 20 from the at least three of the nodes 30 is determined, and the positions of those at least three nodes are known, the position of the UE 20 may be determined by calculating the intersection of the three radii around the three known locations of the nodes 30, wherein the radii are the distances from the respective nodes.

The LCS server 15 may be located anywhere in the network and may be incorporated in other portions such as the RNCs 35 or RNSs 40. Furthermore, an LCS server 15a located in another CN 10a may also request RTT measurements.

Figure 2:
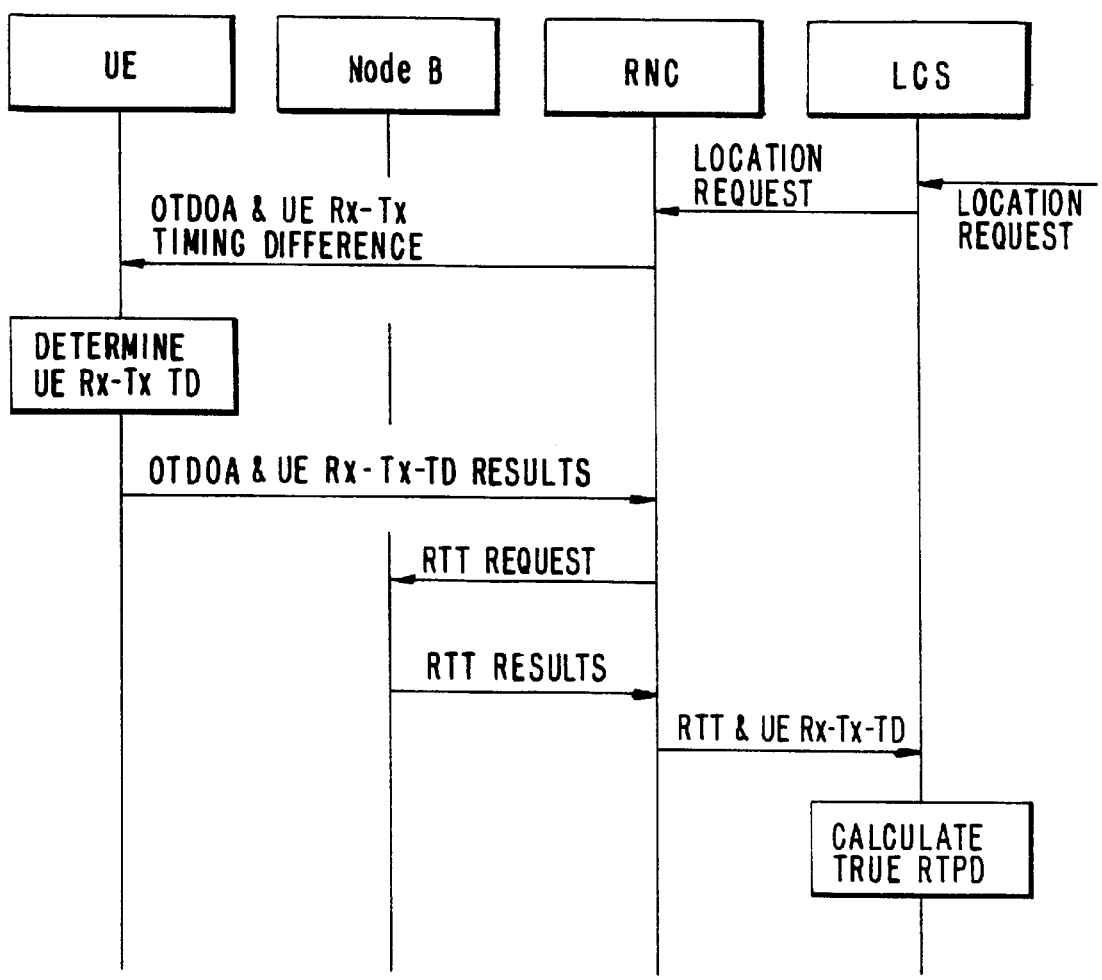
FIG. 2 is a signal flow diagram for the method according to the present invention.
Figure 3:
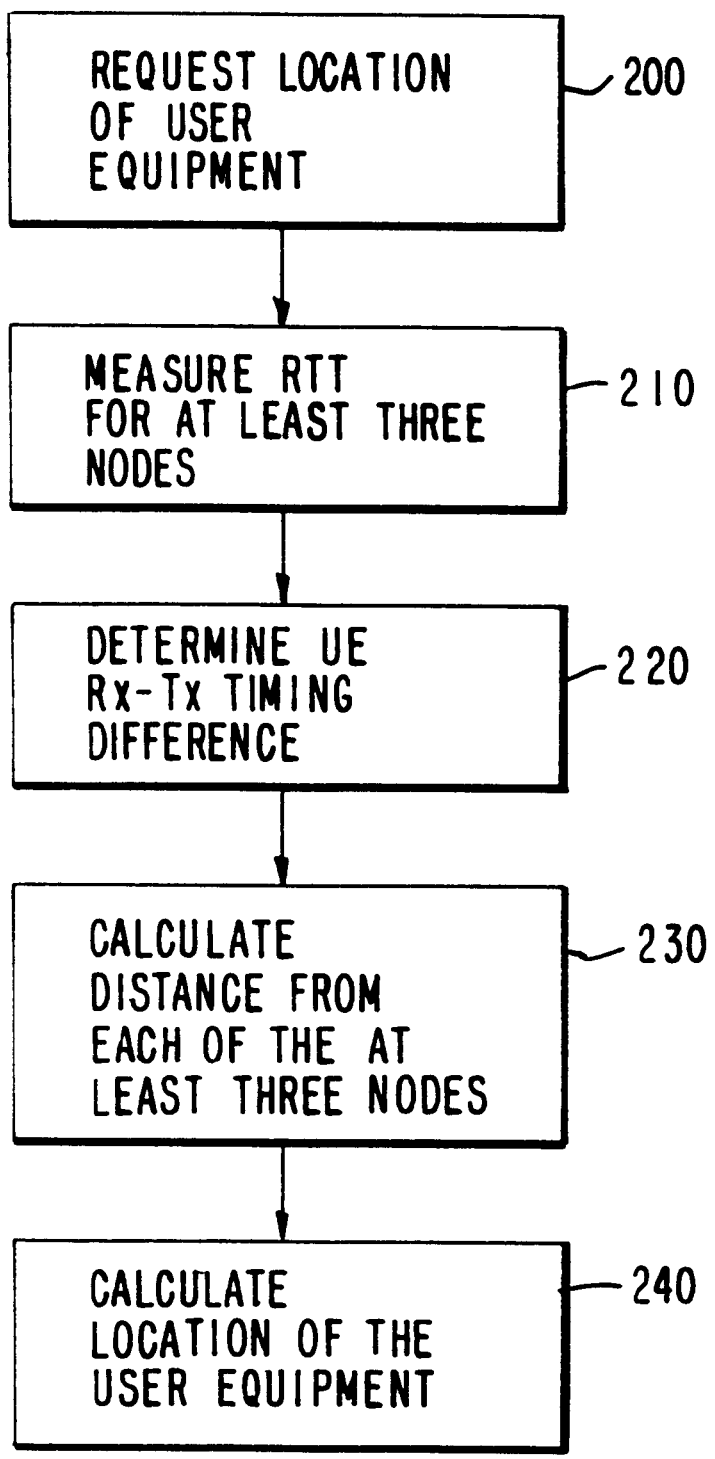
FIG. 3 is a flow diagram showing the steps for determining the geographic location of a UE according to an embodiment of the present invention.

FIG. 2 is a signal flow diagram and FIG. 3 is a flow diagram depicting the steps required for determining the location of a UE by measuring true RTT. Referring to FIG. 3, at step 200, a request for locating, a user equipment is initiated. This may be performed by the user equipment, a client of the core network, or the core network itself to aid in performing an operation on the user equipment such as a hand off operation or a directional transmission. In response to the request, the RTT is measured between the UE and the active node Bs 30 in the UTRAN 50 and the results are transmitted to the LCS server 15, step 210. FIG. 2 shows the signal flow for measuring RTT. The RNC transmits a request to the UE for measuring OTDOA and UE Rx–Tx timing difference for each active node B. Each active node B sends a DL transmission to the UE and the UE transmits a UL transmission in return which is received by each active node B. The results of the measurements are transmitted to the LCS server 15. The RNC requests RTT measurements from the active node Bs and the locations of the BTSs (cells) of the active node Bs 30 are also transmitted to the LCS server 15 in step 210. The results of the UE Rx–Tx timing difference and RTT measurements are transmitted back to the LCS server, step 220. These results may be transmitted separately or with the uplink transmission from the UE. The results of all measurements are sent to the LCS server 15. The LCS server 15 then determines the portion of the RTT associated with propagation delay. Since the propagation delay is associated with distance (i.e., distance=velocity×time), the distance of the UE from each of the active nodes 30 may then be calculated, step 230. The distance from each of the at least three nodes is used to generate a circle around each of the active nodes 30, wherein the radius of each circle is the distance of the UE from each respective one of the active nodes 30. The UE location may then be calculated by determining the intersection of the circles, step 240.

The step of measuring the RTT, step 210, may be accomplished by transmitting a frame in a DL transmission specifically for measuring the RTT. Alternatively, the RTT may be measured during a DL transmission for another function, such as, for example, signals related to cell selection, cell reselection and/or cell monitoring, thereby reducing the number of required transmissions. Furthermore, the RTT may be measured on a periodic basis, wherein the latest RTT measurement is used for the purpose of determining the geographic location of the UE.

If step 210 comprises periodic measurements of RTT, the step of transmitting the current UE Rx–Tx timing difference, step 220, may also be performed with each periodic measurement. Alternatively, the step of transmitting the current UE Rx–Tx timing difference, step 220, may be performed each time a location is requested by the LCS server 15. In a further embodiment, step 220 may be performed each time the UE changes its UE Rx–Tx timing difference.

Figure 5:
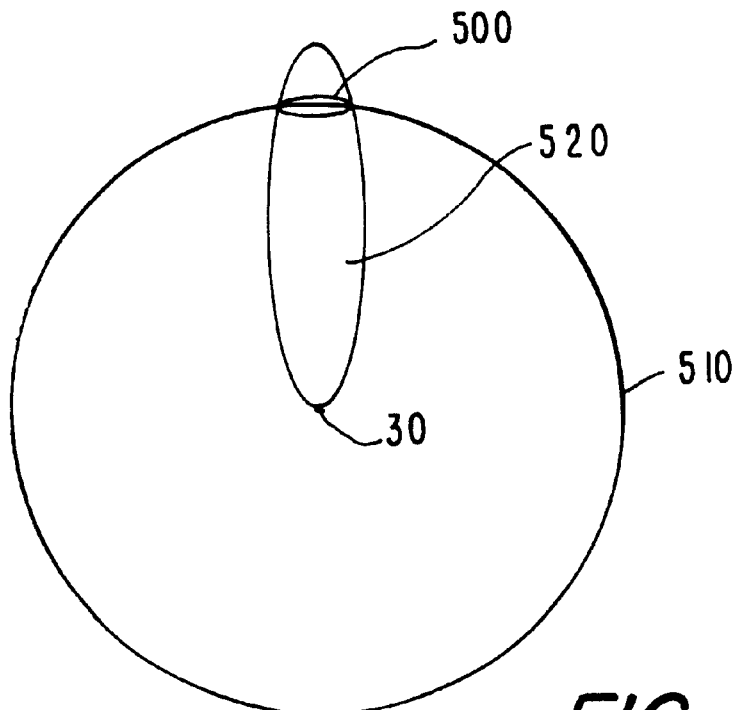
FIG. 5 is a schematic diagram showing the measurements used for determining a location of a UE using one RTT measurement and an AOA measurement.
Figure 6:
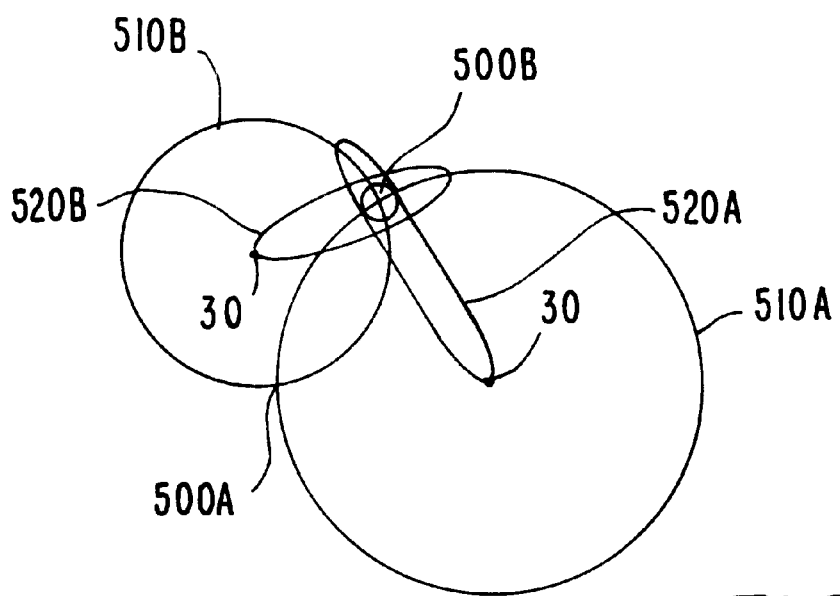
FIG. 6 is a shematic diagram showing the measurements used for determining a location of a UE using two RTT measurements and two AOA measurements.

Furthermore, if only one or two BTS's are available for performing RTT measurements, Angle of Arrival (AOA) information may be used to determine UE location. AOA information may be measured as described in technical specification 3G TS 25.305, version 3.1.0. Regarding the gathering of AOA information, each BTS typically has several sectors and each UE is connected to a single or several sectors, from a list of active sectors, the BTS can obtain a rough AOA estimate. For example, if a BTS has three sectors, each sector covers 120 degrees of the total 360 degrees around an antenna. The use of a smart antenna may narrow the angle estimate. Referring to FIG. 5, a location estimate 500 for a UE 20 may be computed using a true RTPD measurement to determine a radius 510 around a BTS 30 and an AOA measurement 520 at the BTS 30. The accuracy of the location estimate 500 using this method is subject to the accuracy of AOA measurement 520. FIG. 6 shows a location estimate using two BTS. If the two BTSs 30 use only RTPD measurements, the UE 20 may be located either of the intersections 500A, 500B of the two circles 510A, 510B. The AOA information 520A, 520B allows the proper UE location to be determined. The situation shown in FIG. 6 in which two BTSs are in contact with the UE occurs during a soft handover. Furthermore, soft handovers occur frequently in WCMDA networks. Therefore, the location estimation using true RTT and AOA information from two BTSs may be readily used in WCDMA networks without additional communication traffic.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for calculating round trip propagation delay for a user equipment in a wireless network, comprising the steps of:
   (a) measuring a round trip time comprising a time from a beginning of a downlink transmission signal from a node of the wireless network to the user equipment to the reception of an uplink transmission signal from the user equipment to the node in response to the downlink transmission signal;
   (b) measuring, by the user equipment, a user equipment Rx–Tx timing difference comprising a time difference between reception of the downlink transmission signal at the user equipment and transmission of the uplink transmission signal from the user equipment during said step (a); and
   (c) determining the round trip propagation delay between the user equipment and the node by subtracting the user equipment Rx–Tx timing difference determined in said step (b) from the round trip time measured in said step (a).

2. The method of claim 1, wherein said step (a) comprises periodically measuring a round trip time from the user equipment to the node of the wireless network.

3. The method of claim 2, wherein said step (b) comprises determining said user equipment Rx–Tx timing difference for each periodic measuring of the round trip time.

4. The method of claim 1, wherein said step (b) comprises periodically determining the user equipment Rx–Tx timing difference.

5. The method of claim 1, wherein said step (a) comprises transmitting a downlink transmission to the user equipment solely for measuring round trip time.

6. The method of claim 5, wherein said step (a) comprises:
   transmitting a downlink transmission signal to the user equipment from the node;

generating a response to the downlink transmission signal at the user equipment;

transmitting the response in an uplink transmission from the user equipment to the node; and measuring a time at the node from the beginning of transmission of the downlink transmission signal to the beginning of the reception of the uplink transmission.

7. The method of claim 6, wherein said step (b) comprises transmitting said user equipment Rx–Tx timing difference with the response transmitted from the user equipment to the node.

8. The method of claim 1, wherein said step (a) comprises measuring the round trip time for a downlink transmission and an uplink transmission between the user equipment and the node, wherein the downlink transmission and the uplink transmission comprise transmissions made for functions other than measuring the round trip time.

9. The method of claim 8, wherein said step (a) comprises:

transmitting a downlink transmission signal to the user equipment from the node;

generating a response to the downlink transmission signal at the user equipment;

transmitting the response in an uplink transmission from the user equipment to the node; and measuring a time at the node from the beginning of transmission of the downlink transmission to the beginning of the reception of the uplink transmission.

10. The method of claim 9, wherein said step (b) comprises transmitting the user equipment Rx–Tx timing difference with the response transmitted from the user equipment to the node.

11. A method determining a geographic location of a user equipment via a location service server in a wireless network, comprising the steps of:

(a) measuring a round trip time comprising a time from a beginning of a transmission of a downlink transmission signal from a first active node of the wireless network to the user equipment to the reception of an uplink transmission signal from the user equipment to the first active node in response to the downlink transmission signal;

(b) measuring, by the user equipment, a user equipment Rx–Tx timing difference comprising a time difference between reception of the downlink transmission signal at the user equipment and transmission of the uplink transmission signal from the user equipment during said step (a);

(c) determining a propagation delay between the user equipment and the first node by subtracting the current transmission timing delay determined in said step b from the round trip times measured in said step (a);

(d) repeating steps (a)–(c) for all remaining active nodes of the wireless network;

(e) determining the geographical location of the active nodes; and (f) determining the location of the user equipment using the location of the active nodes and the propagation delay of each of the active nodes determined in said step (c).

12. The method of claim 11, further comprising, before said steps (a) through (f), the step of transmitting a request for the geographic location of the user equipment to the location service server.

13. The method of claim 12, wherein said steps (a) through (f) are performed in response to said step of transmitting a request for the geographic location.

14. The method of claim 12, wherein said step of transmitting a request for the geographic location comprises transmitting a request by said user equipment.

15. The method of claim 12, wherein said step of transmitting a request for the geographic location comprises transmitting a request by an external client.

16. The method of claim 12, wherein said step of transmitting a request for the geographic location comprises transmitting a request by the core network.

17. The method of claim 11, wherein said step (b) comprises transmitting a user equipment Rx–Tx timing delay from the user equipment to the location services server each time the user equipment Rx–Tx timing delay is changed.

18. The method of claim 11, further comprising periodically performing step (a) for the active nodes of the wireless network.

19. The method of claim 11, wherein said step (b) comprises determining said user equipment Rx–Tx timing difference for each performance of said step (a).

20. The method of claim 11, wherein said step (b) comprises periodically determining the user equipment Rx–Tx timing difference between the user equipment and the active nodes.

21. The method of claim 11, wherein said step (a) comprises transmitting a downlink transmission signal to the user equipment solely for measuring round trip time.

22. The method of claim 21, wherein said step (a) comprises:

transmitting downlink transmission signal to the user equipment from each of the active nodes;

generating a response to the downlink transmission at the user equipment, respectively transmitting the response in an uplink transmission from the user equipment to the active nodes; and measuring a time at each of the active nodes from the beginning of transmission of the downlink transmission signal to the beginning of the reception of the uplink transmission signal.

23. The method of claim 22, wherein said step (b) comprises transmitting said current timing delay with the response transmitted from the user equipment to the one of the nodes.

24. The method of claim 11, wherein said step (a) comprises measuring the round trip time for a downlink transmission and an uplink transmission between the user equipment and the active nodes, wherein the downlink transmission and the uplink transmission comprise transmissions made for functions other than measuring the round trip time.

25. The method of claim 24, wherein said step (a) comprises:

transmitting a downlink transmission signal to the user equipment from the active nodes;

generating a response to the predetermined downlink transmission at the user equipment;

transmitting the response in an uplink transmission from the user equipment to the active nodes; and measuring a time at each of the active nodes from the beginning of transmission of the downlink transmission to the beginning of the reception of the uplink transmission.

26. The method of claim 25, wherein said step (b) comprises transmitting user equipment Rx–Tx timing difference with the response transmitted from the user equipment to the one of the nodes.

27. The method of claim 11, wherein said step (f) comprises:
   determining a distance of the user equipment from each of the active nodes using the propagation delay;
   calculating a hyperboloid around each of the active nodes, wherein the radius of each hyperboloid is the distance of the user equipment from the respective one of the active nodes; and
   determining the geographic location of the user equipment as the intersection of the hyperboloids.

28. A method of determining a geographic location of a user equipment in a wireless network having a location server;
   (a) measuring a round trip time from the user equipment to a first node of the wireless network of known location, the round trip time comprising a time from a beginning of transmission of a downlink transmission signal from a first node of the wireless network to the user equipment to the reception of an uplink transmission signal from the user equipment to the first node in response to the downlink transmission signal;
   (b) measuring, by the user equipment, a user equipment Rx–Tx timing difference comprising a time difference between reception of the downlink transmission signal at the user equipment and transmission of the uplink transmissiona signal from the user equipment during said step (a);
   (c) determining a propagation delay between the user equipment and the first node by subtracting the user equipment Rx–Tx timing difference determined in said step (b) from said round trip time measured in said step (a);
   (d) determining an angle arrival of the radio signals used for said step (a) at the first node; and
   (e) determining a location estimation for said user equipment using a geographical location of the first node, the propagation delay from said step (c) to determine a distance from the first node, and the angle of arrival determined in said step (d).

29. The method of claim 28, wherein said step (a)–(e) are repeated for a second node, and said step (e) comprises determining a location estimation using the propagation delay to determine a distance of the user equipment from each of the first and second nodes, and the angle of arrival at each of the first and second nodes.

30. In a wireless communication system comprising a core network, a plurality of radio network controllers, and a plurality of wireless communication nodes for communicating with user equipment located in a geographical area supported by said nodes, a location services server, comprising:
   means for determining a round trip time by measuring a time from a beginning of transmission of a downlink transmission signal from a node of the wireless network to the user equipment to the reception of an uplink transmission signal from the user equipment to the node in response to the downlink transmission signal;
   means for measuring, by the user equipment, a user equipment Rx–Tx time difference of a user equipment comprising a time difference between reception of the downlink transmission signal at the user equipment and transmission of the uplink transmission signal from the user equipment during the measurement of round trip time; and
   means for determining a round trip time delay by subtracting said user equipment Rx–Tx timing difference from said round trip time.

31. The location services server of claim 30, further comprising means for determining round trip times and user equipment Rx–Tx time differences for a plurality of nodes, means for determining a geographical location of said plural nodes, and means for determining a geographical location of a user equipment using said true round trip time delays for said plural nodes and the geographical locations of said plural nodes.

32. The location services server of claim 30, further comprising means for determining an angle of arrival of radio signals at said node, means for determining a location of said node, and means for determining a location of said user equipment using said angle of arrival, said round trip time delay, and said location of said node.

33. In a wireless communication system comprising a core network, a plurality of radio network controllers, and a plurality of wireless communication nodes for communicating with user equipment located in a geographical area supported by said nodes, a user equipment comprising means for measuring a user equipment Rx–Tx timing difference comprising a time difference between reception of a downlink transmission signal at the user equipment and transmission of an uplink transmission signal from the user equipment in response to the downlink transmission signal.

* * * * *